US 9,032,632 B2

(12) United States Patent
Durivault et al.

(10) Patent No.: US 9,032,632 B2
(45) Date of Patent: May 19, 2015

(54) METHOD AND DEVICE FOR INSPECTING A THREADING OF A TUBULAR CONNECTION USED IN THE OIL INDUSTRY

(75) Inventors: Jerome Durivault, Paris (FR); Nigel Cross, Chessington (GB); Florian Peuchot, Toulouse (FR)

(73) Assignees: VALLOUREC OIL AND GAS FRANCE, Aulnoye-Aymeries (FR); NIPPON STEEL & SUMITOMO METAL CORPORATION, Tokyo (JP)

( * ) Notice: Subject to any disclaimer, the term of this patent is extended or adjusted under 35 U.S.C. 154(b) by 158 days.

(21) Appl. No.: 13/816,417

(22) PCT Filed: Aug. 18, 2011

(86) PCT No.: PCT/EP2011/064236
§ 371 (c)(1),
(2), (4) Date: Feb. 11, 2013

(87) PCT Pub. No.: WO2012/022787
PCT Pub. Date: Feb. 23, 2012

(65) Prior Publication Data
US 2013/0152409 A1 Jun. 20, 2013

(30) Foreign Application Priority Data
Aug. 20, 2010 (FR) .................................... 10 03414

(51) Int. Cl.
*G01B 3/48* (2006.01)
*G01B 3/16* (2006.01)
*G01B 3/26* (2006.01)

(52) U.S. Cl.
CPC *G01B 3/48* (2013.01); *G01B 3/166* (2013.01); *G01B 3/26* (2013.01)

(58) Field of Classification Search
CPC .......................................................... G01B 3/48
USPC ...................................................... 33/199 R
See application file for complete search history.

(56) References Cited

U.S. PATENT DOCUMENTS

| 1,465,583 | A | * | 8/1923 | Miley .......................... 33/199 R |
| 2,004,225 | A | * | 6/1935 | Steinle ........................ 33/199 R |
| 2,694,262 | A | * | 11/1954 | Daniel ....................... 33/501.11 |
| 3,014,281 | A |   | 12/1961 | Caporicci |
| 3,154,860 | A |   | 11/1964 | Bodner |
| 3,859,730 | A |   | 1/1975 | Johnson |

(Continued)

FOREIGN PATENT DOCUMENTS

| DE | 946 482 | 8/1956 |
| JP | 7-120203 | 5/1995 |
| JP | 2006-78327 | 3/2006 |

OTHER PUBLICATIONS

International Search Report Issued Oct. 5, 2011 in PCT/EP11/64236 Filed Aug. 18, 2011.

Primary Examiner — Christopher Fulton
(74) Attorney, Agent, or Firm — Oblon, McClelland, Maier & Neustadt, L.L.P.

(57) ABSTRACT

A device and method for inspecting a width of thread roots of a tubular component for exploration or working of hydrocarbon wells, the device including two arms each including a first and a second end, the first ends being connected together by a deformable portion allowing an angular displacement between the second ends, the second ends each carrying a contact element and a mechanism determining the angular displacement.

4 Claims, 4 Drawing Sheets

(56) References Cited

U.S. PATENT DOCUMENTS

| | | | |
|---|---|---|---|
| 4,127,112 A | 11/1978 | Sherlock et al. | |
| 4,202,109 A * | 5/1980 | Schasteen | 33/199 R |
| 4,211,014 A * | 7/1980 | Koltgen | 33/501.4 |
| 4,279,079 A * | 7/1981 | Gamberini et al. | 33/783 |
| 4,386,467 A * | 6/1983 | Possati et al. | 33/542 |
| 4,419,829 A * | 12/1983 | Miller | 33/501.08 |
| 4,447,960 A * | 5/1984 | Golinelli et al. | 33/501.09 |
| 4,610,090 A | 9/1986 | Brady | |
| 5,020,230 A * | 6/1991 | Greenslade | 33/199 R |
| 5,157,845 A * | 10/1992 | Possati et al. | 33/544 |

* cited by examiner

METHOD AND DEVICE FOR INSPECTING A THREADING OF A TUBULAR CONNECTION USED IN THE OIL INDUSTRY

The present invention relates to a device for inspecting the width of the thread roots produced close to one of the ends of a tubular component used in the exploration or working of hydrocarbon wells. The invention also relates to a method for inspecting such a threading.

The conformity of the threadings of tubular components used in the exploration or working of hydrocarbon wells can be inspected. Because of the loads exerted during service (whether during drilling operations or during working), it is desirable for the threaded zones to be machined to specification and that the tolerances are adhered to.

A number of inspection devices are known.

The document EP 1 837 620, for example, describes an annular gauge for inspecting, at a precise location, the geometry of tapered multistart threadings comprising teeth or threads with a V-shaped profile or a truncated V-shaped profile. The gauge is locked by screwing it into the tapered threading until the diameter of the annular gauge becomes smaller than that of the threading. That type of device provides information for only a very restricted portion of the threaded zone.

The document U.S. Pat. No. 1,792,936 describes a gauge comprising an annular portion and an arm to "simulate" a makeup operation on a threading with a constant lead. The inspection operation is very time-consuming as it is not easy to carry out. The arm and the gauge have to be placed on the threading and then makeup has to be simulated.

The document FR 954 265 describes a flat gauge comprising several threads with a V-shaped profile each extending in a longitudinal direction, the set of longitudinal directions being concurrent such that their width is variable according to the directions. That device cannot produce accurate values regarding the size of the thread roots and crests.

The document FR 2 938 055 describes a gauge comprising at least two threads for inspecting self-locking threadings. The principle consists of verifying the locking position of the gauge, which enables to validate the fact that the dimensions of the threaded zone are correct at that position. Nevertheless that gauge is only of interest for self-locking type threadings.

In general, known devices are not versatile in terms of use. Those gauges can only be used to inspect a single, particular type of threading at one particular location. The measurement obtained is not always very accurate.

The Applicant wished to develop an inspection device enabling to obtain more precise, accurate measurements which could be used for a large variety of threading profiles.

More precisely, the invention provides a device for inspecting the width of the thread roots of a tubular component for the exploration or working of hydrocarbon wells, comprising two arms each provided with a first and a second end, the first ends being connected together by means of a deformable portion allowing an angular displacement between the second ends, the second ends each carrying a contact element and the inspection device further comprising means for determining the angular displacement.

Optional characteristics, which are complementary or substitutional, will be defined below.

One of the arms may further comprise a sensor for establishing the relative position of the arms with respect to each other.

The contact elements may be removably mounted on the mobile ends.

The mobile ends may each comprise a fittable and removable plate which carries the contact elements.

The contact elements may each have a substantially spherical form.

The contact elements may each have a substantially cylindrical form.

The axes of the cylindrical contact elements may be parallel.

The cylindrical contact elements may be substantially aligned.

The faces opposite to the faces of the cylindrical contact elements which face each other, may be bulged.

The mobile ends may each comprise a shoulder.

The arms and the deformable portion may form a single part, the thickness of the deformable portion being less than that of the arms in order to allow the angular displacement between the mobile ends of the arms.

The invention concerns a method for inspecting a threading of a tubular component for the exploration or working of hydrocarbon wells, in which:
  an inspection device in accordance with the invention is positioned so that one of the contact elements of the device is in contact with a load flank of the threading while the other contact element is in contact with a stabbing flank of the threading, the two contact elements being within the same thread root;
  the angular displacement e is measured;
  the angular displacement measured previously, e, is compared with a reference value e-ref.

In a first variation, when positioning the inspection device, at least one of the two contact elements is in contact with the thread root.

In a second variation, when positioning the inspection device, at least one of the shoulders bears on a thread crest.

The contact between the elements in contact and the flanks may be made at the mid-height of the flanks of the threading.

Other advantages and characteristics of the invention will become apparent from the following detailed description of examples which are in no way limiting and from the accompanying drawings, which may not only serve to provide a better understanding of the invention, but also contribute to the definition if appropriate.

Figure 3:
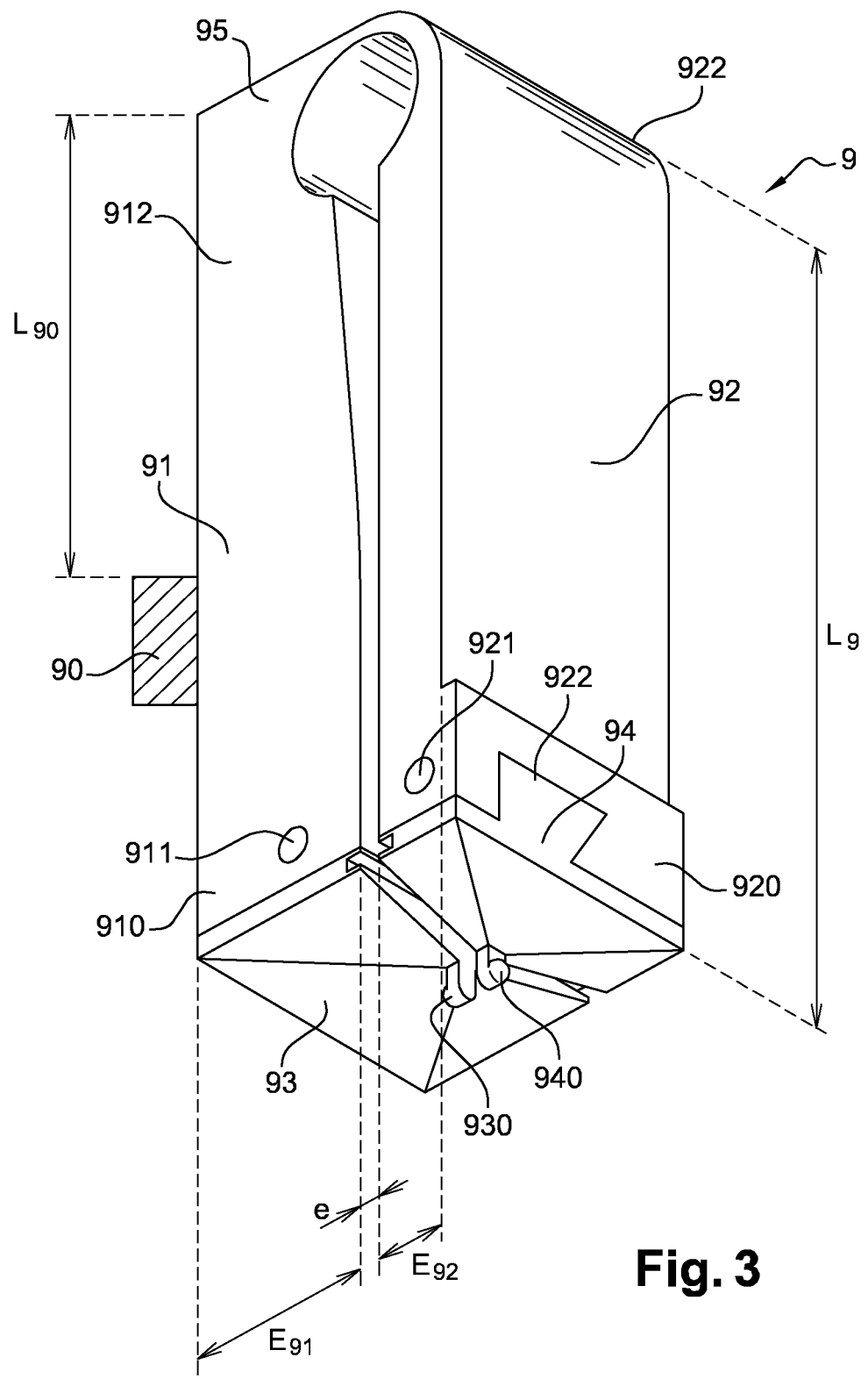

FIG. 3 respectively shows a perspective view of one implementation of the invention.

FIGS. 4, 5, 6a, 6b and 7 respectively show detailed views of embodiments of the invention.

Figure 1:
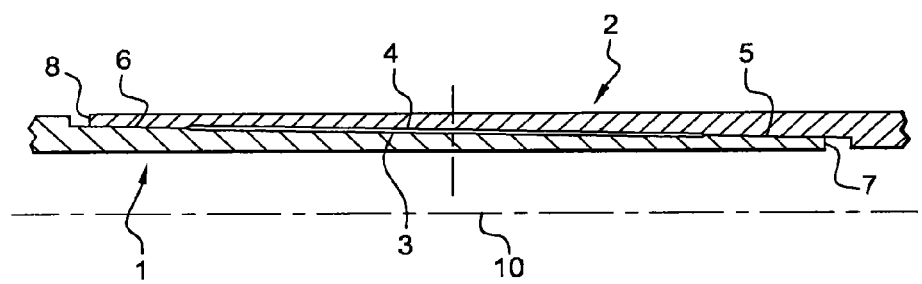
FIG. 1 shows a sectional view of a connection resulting from makeup of two threaded tubular components.

FIG. 1 shows a threaded connection between two substantially tubular components intended to be connected together by means of threadings and intended to be integrated into a working string of a hydrocarbon well. The connection, as is conventional, comprises a component provided with a male end 1 and a component provided with a female end 2, the male end 1 being capable of being connected to the female end 2. In this type of connection, the end 1 comprises a first and a second sealing surface that can respectively cooperate by tightening with a first and a corresponding second sealing surface of the female end 2, in order to form a first, 5, and a second, 6, sealing zone. The end 1 also comprises a male threaded zone 3 that can be made up into a corresponding threaded zone 4 of the female end 2, the threaded zones being provided between two sealing zones 5 and 6. The ends 1 and 2 each end in respective distal surfaces 7 and 8.

Figure 2:
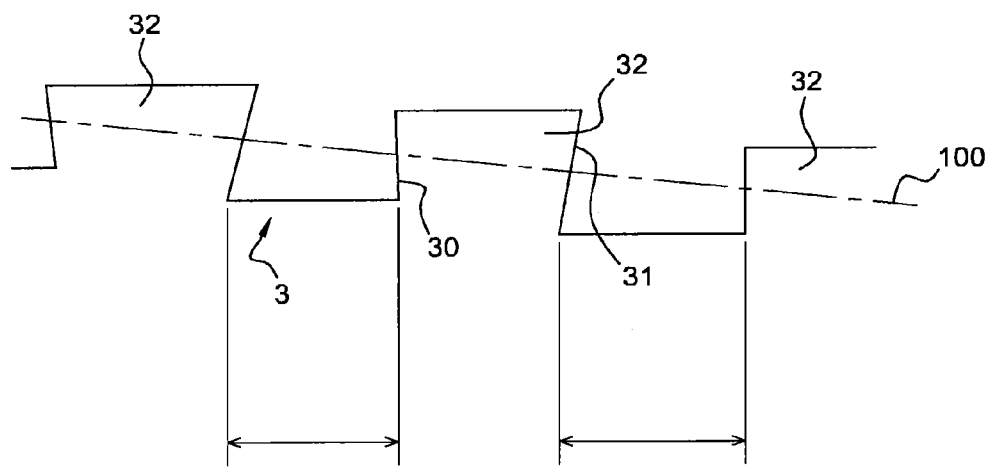
FIG. 2 shows a detail of a sectional view of a threading of a tubular component.

FIG. 2 shows details of the threaded zones 3 of a self-locking male threading. The complementary female threading is not shown in the figures. The term "self-locking" threadings means threadings comprising the features detailed below. The male threads, like the female threads, have a constant lead. Their width decreases in the direction of their respective distal surfaces 7, 8 such that when making up, the male and female threads finish by locking into each other at a predetermined position.

More precisely, the lead of the load flanks of the female threading is constant, like the lead of the stabbing flanks of the female threading. The lead of the load flanks is greater than the lead of the stabbing flanks.

The lead of the stabbing flanks 31 of the male threading 3 is constant, like the lead of the load flanks 30 of the male threading. The lead of the stabbing flanks 31 is less than the lead of the load flanks 30.

Contact is principally made between the male and female load flanks 30, as with the male and female stabbing flanks 31. In general, a displacement is provided between the crests of the male threads and the roots of the female threads, while the roots of the male threads and the crests of the female threads are in contact. The clearance means that grease can be evacuated during makeup, avoiding any risk of overpressure due to the grease.

The threading has a lead $LFP_p$ of constant width between the load flanks, and a lead of constant width $SFP_p$ between the stabbing flanks, as well as increasing thread root widths from a value WIDTHmin to a value WIDTHmax in the direction of the distal surface 7 of the tubular component.

Advantageously, the male and female threads have a dovetail profile so that they are securely fitted into each other after makeup. This additional guarantee dispenses with risks of disengagement (also known as jumping-out), which corresponds to the male and female threads coming apart when the connection is subjected to large bending, tensile or pressure loads. Advantageously, the threadings 1 and 2 have a tapered profile following a generatrix with a taper 100 in order to accelerate engagement of the male element into the female element.

In general, this taper generatrix forms an angle with the axis 10 in the range 1.5 degrees to 5 degrees. The taper generatrix in the present case is defined as passing through the centre of the load flanks.

FIG. 3 shows an inspection device 9 which is adapted to the threading 3. The inspection device 9 comprises two arms 91, 92. The arm 91 is provided with a first, 912, and a second, 910, end, while the arm 92 is provided with a first, 922, and a second, 920, end. The first ends 912, 922 are termed "fixed" in that they are connected together via a deformable portion 95. The deformable portion 95 can be used to produce an angular displacement "e" due to pivoting of the second ends 910, 920 of the arms, termed mobile ends. In other words, the second ends 910, 920, termed the mobile ends, may mutually move apart or closer together along a circular arc trajectory which remains in the same plane. The second ends 910, 920, termed mobile, each carry a contact element 930, 940. The inspection device also comprises means 90 for determining the angular displacement e.

Advantageously, the means 90 for determining the angular displacement e comprise a device forming a sensor. This device may be mounted on each of the arms. As an example, it may be possible to use a miniaturized inductive contact type sensor which corresponds to the size of the device 9, or a contactless sensor, such as a capacitive sensor, for example, or an eddy current sensor, or a sensor using optical technology (laser, confocal). These sensors are intended to measure the distance between the contact elements 930, 940. The maximum measurement range is thus equal to the displacement e. The sensor is selected according to criteria of accuracy, bulk, measurement range, and stability under service and environmental conditions. The accuracy criteria required correspond to an order of magnitude of 0.01% of the measurement range.

Advantageously, the arms 91, 92 and the deformable portion 95 are formed as a single piece. The deformable portion 95 is flexible, so as to enable thanks to its flexing the angular displacement e between the mobile ends 910, 920 of the arms. This is achieved by using a suitable material and dimensions. In the present case, the arms and the deformable portion are formed from steel with a smaller thickness for the deformable portion than for the arms.

Advantageously, the deformable portion 95 is not only flexible but also elastic, so that the arms are in a reference position when at rest, i.e. when the inspection device is not in service.

Other implementations can be envisaged, for example by connecting the fixed ends of the arms using screws and by interposing a spring between them to maintain the arms in a reference position.

The dimensions of the device in the case in which the deformable portion and the arms form a single steel piece, as a function of the height, h, of the threading and the width, WIDTH, of the thread roots, may be as follows:
  the diameter of the contact elements is in the range 0.5 h to 1.2 h;
  the displacement at rest is in the range 0.1 WIDTH to 0.6 WIDTH;
  the length of the contact elements is in the range 1 mm to 2 h;
  the ratio of the arm thicknesses is greater than 2;
  this difference in thickness mainly enables to restrict the movement to a single arm.
  Thus, the arm which remains fixed acts as a reference and it is easier to measure the displacement e of the other, mobile, arm;
  the thickness of the deformable portion is in the range 0.005 to 0.5 times the thickness of the thinnest arm;
  the reduction in thickness of the deformable portion with respect to the thickness of the arms, and in particular with respect to the thickness of the thinnest arm, provides the deformable portion with the desired flexibility to produce the displacement e of the arms with respect to each other.

Advantageously, the contact elements 930, 940 are removably mounted on the mobile ends 910, 920. This means that if required, only the ends need to be changed (wear, breakage, etc).

Advantageously, the mobile ends 910, 920 each comprise a fittable and removable plate which carries one of the contact elements 930, 940. This enables the contact element to be changed rapidly. The plates are fitted then secured on the respective arms using a screw 911, 921.

Figure 4:
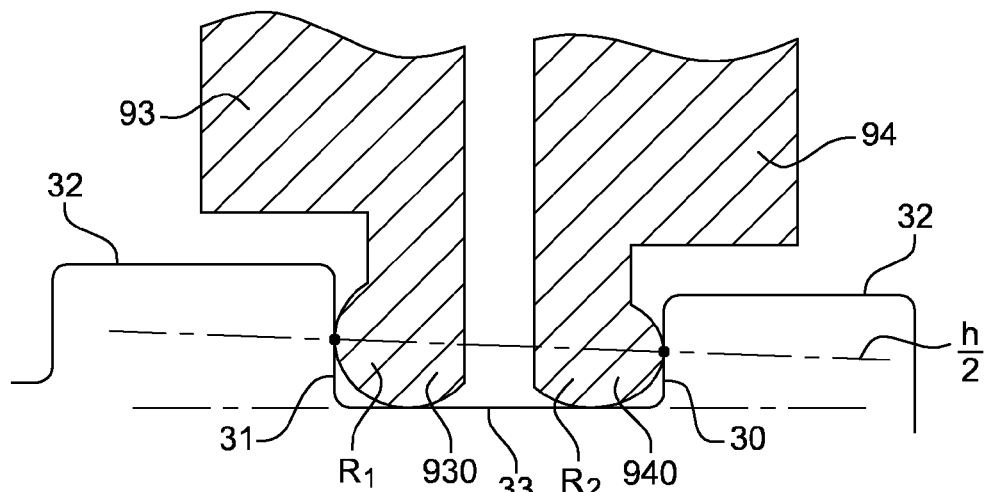
Figure 5:
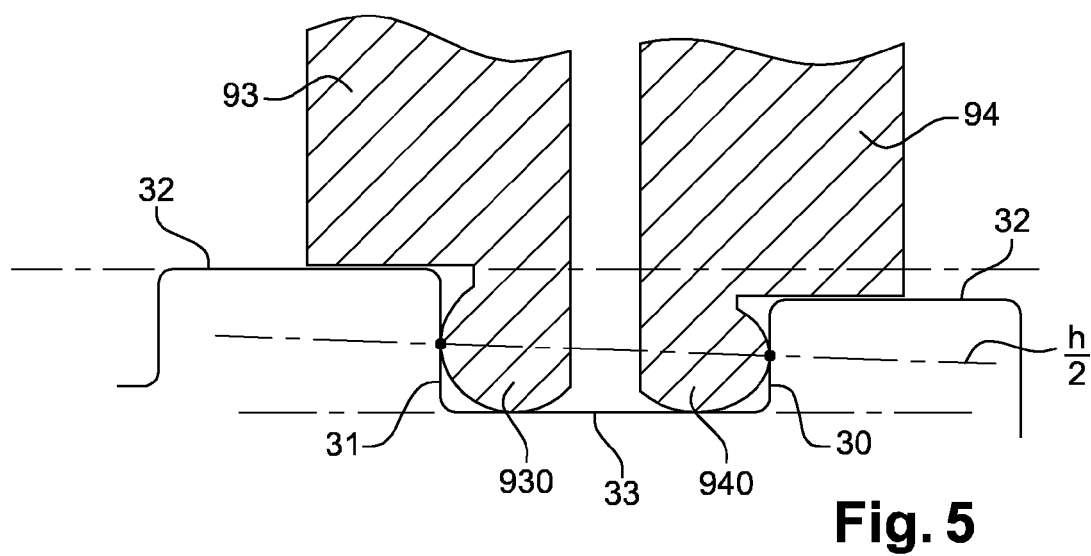

In a first embodiment and as can be seen in FIGS. 4 and 5, the contact elements 930, 940 each have a substantially spherical form. The contact elements 930, 940 respectively have a radius R1 and R2. This configuration means that the contact is a point contact between the contact element and the flank of the threading. Similarly, in the case in which the inspection device bears against the thread roots, the contact between the contact element and the thread roots is also a point contact.

In a second embodiment, the contact elements 930, 940 each have the form of a substantially cylindrical portion.

Figure 7:
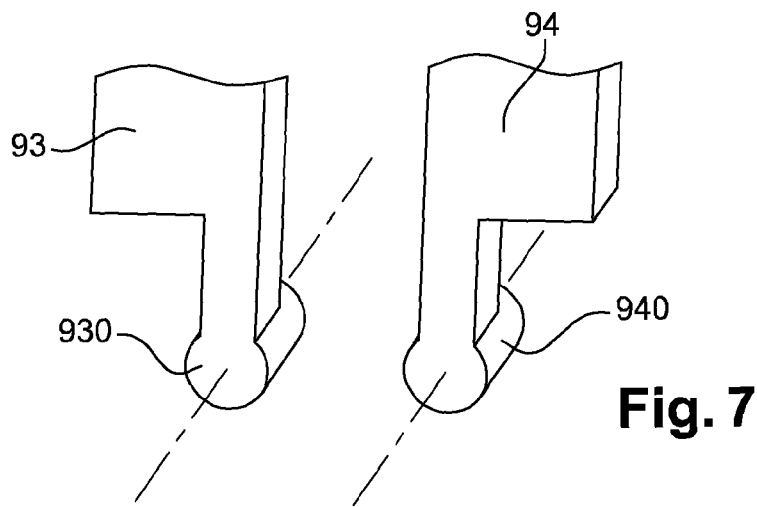

In a first variation and as can be seen in FIG. 7, the cylindrical contact elements are parallel. This configuration enables the contact between the contact element and the flank of the threading to be linear. Similarly, in the case in which the inspection device bears on the thread roots, contact between the contact element and the thread roots is also linear.

Figure 6A:
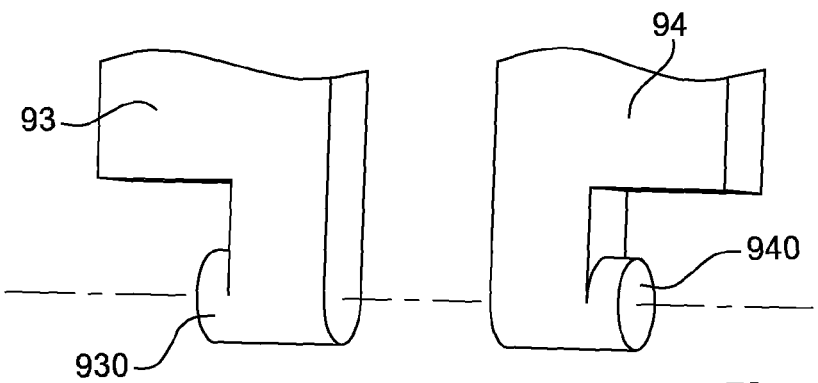

In a second variation and as can be seen in FIG. 6a, the axes of the cylindrical contact elements are substantially coincident. In other words, the contact elements are in the same alignment. This configuration enables—in the case in which the flanks of the threading are perpendicular to the axis of the cylindrical contact elements—to obtain an essentially surface-like contact between the contact element and the flank of the threading. Furthermore, in the case in which the inspection device bears on the thread roots, contact between the contact element and the thread roots is linear.

Figure 6B:
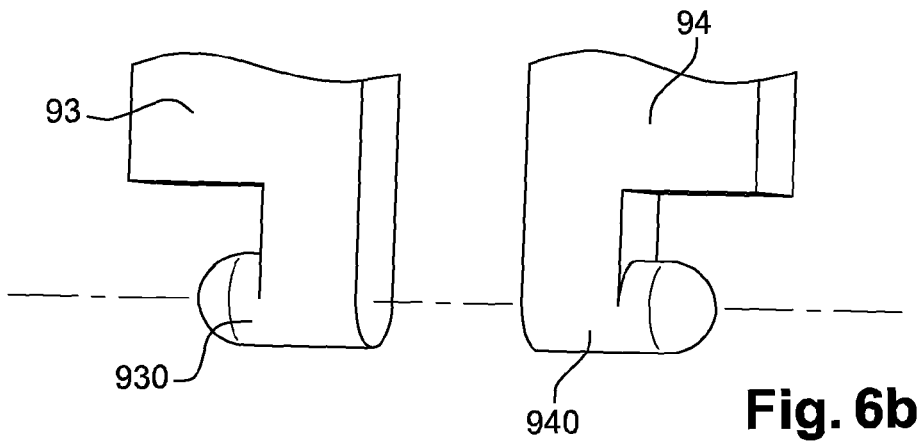

In the case in which the flanks of the threading to be inspected are inclined (this is the case for very many threadings, such as threadings with a V-shaped profile, a truncated V-shaped profile, a trapezoidal profile, a dovetail profile, etc), it is preferable for the faces opposite to the facing cylindrical contact element faces to be bulged. Referring to FIG. 6b, it can be seen that contact between the contact element and the flanks is ensured and it is a point contact.

In accordance with one embodiment and as can be seen in FIGS. 3 to 7, the mobile ends 940, 920 each comprise a shoulder 93, 94. This allows the shoulders, and as a consequence the inspection device, to be brought to bear on the thread crests.

The Applicant has developed the inspection device in order to measure the width of the thread roots. This measurement is the basis of a method comprising the following steps:

firstly, the inspection device is positioned so that one of the contact elements 930 is in contact with a load flank of the threading while the other contact element 940 is in contact with a stabbing flank 31, the two contact elements being within the same thread root 33;

next, the angular displacement e is measured;

then the value of the previously measured angular displacement e is compared with a reference value e-ref.

The value of the displacement e is linked to the width WIDTH of the thread root. In fact, starting from the angular displacement between the arms and from the dimensions of the inspection device, the distance between the contact elements 930, 940 can be calculated, and thus the width WIDTH of the thread root. Thus, the reference value e-ref is associated with a reference value WIDTHref for the thread root. The reference value WIDTHref is generally set out in the manufacturing specifications.

In the case in which the mobile ends 940, 920 each comprise a shoulder 93, 94 and as a function of the dimensions of the contact elements, said shoulders may bear respectively on the two consecutive thread crests 32 which frame the thread root 33, the first and second thread crests 32 defining the thread root 33.

If not, the two contact elements are brought into contact with the thread root 33.

Conventionally, contact between the contact elements and the flanks 30, 31 is made at the mid-height h/2 of the flanks 30, 31 in order to determine the width of the thread roots at their mid-height.

In conclusion, the inspection device has the advantage of being universal in that it can be used to inspect a wide variety of threading profiles.

Further, it has the advantage of being highly versatile in use, as the measurement can be made on various parts of the threading.

Furthermore, using sensors enables the measurement to be reliable.

Furthermore, in contrast to the inspecting gauges of the prior art, the device is not prone to wear because its use involves very little friction.

The use of spherical or aligned cylindrical contact elements enables the contact with the flanks of the threading to be point contact. The inspection device 9 may be combined with a guide in order to position the contact elements very accurately. Similarly in the case of self-locking threadings where the width of the thread roots varies over the entire length of the threading, the measurement of the width of the thread roots may be made at a predetermined distance from the terminal surface of the tubular component. The axial position of the measurement is thus taken into consideration by said guide.

Similarly, in self-locking threadings with a dovetail flank profile, as was the case with threadings with a V-shaped profile, the thread flanks are not perpendicular to the axis of rotation of the tubular component. For this reason, the width of the thread root varies depending on whether the measurement is made at the thread root, at the mid-height of the thread root or at the thread crest. A guide is also useful when considering the radial position of the measurement to be made.

The use of parallel cylindrical contact elements provides a quasi linear contact with the flanks of the threading, because of the helix angle of the threading. The use of a guide is recommended in order to position the contact elements of the inspection device both axially and radially.

The invention claimed is:

1. A method for inspecting a threading of a tubular component for exploration or working of hydrocarbon wells, comprising:
    positioning an inspection device for inspecting a width of thread roots of the tubular component wells, comprising two arms each including a first and a second end, the first ends being connected together by a deformable portion allowing an angular displacement between the second ends, the second ends each carrying a contact element; and means for determining the displacement, such that one of the contact elements of the device is in contact with a load flank of the threading while the other contact element is in contact with a stabbing flank of the threading, the two contact elements being within a same thread root;
    measuring the angular displacement;
    comparing the thread root width determined as a function of the angular displacement previously measured with a reference value.

2. A method for inspecting a threading according to claim 1, wherein when positioning the inspection device, at least one of the two contact elements is also in contact with the thread root.

3. A method for inspecting a threading according to claim 1, wherein when positioning the inspection device, at least one of shoulders of the contact elements bears respectively on one of the thread crests.

4. A method for inspecting a threading according to claim 1, wherein contact between the contact elements and the flanks is made at a mid-height of the flanks.

* * * * *